United States Patent
Mellitz et al.

(10) Patent No.: US 9,197,288 B2
(45) Date of Patent: Nov. 24, 2015

(54) DETERMINING THE SIGNAL QUALITY OF AN ELECTRICAL INTERCONNECT

(71) Applicant: Intel Corporation, Santa Clara, CA (US)

(72) Inventors: Richard Mellitz, Prosperity, SC (US); Adee Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 13/994,191

(22) PCT Filed: Mar. 8, 2013

(86) PCT No.: PCT/US2013/029886
§ 371 (c)(1),
(2) Date: Jun. 14, 2013

(87) PCT Pub. No.: WO2013/138180
PCT Pub. Date: Sep. 19, 2013

(65) Prior Publication Data
US 2014/0072023 A1 Mar. 13, 2014

Related U.S. Application Data

(60) Provisional application No. 61/609,804, filed on Mar. 12, 2012.

(51) Int. Cl.
*H04B 3/32* (2006.01)
*H04B 3/46* (2015.01)
*H04B 3/487* (2015.01)

(52) U.S. Cl.
CPC . *H04B 3/46* (2013.01); *H04B 3/487* (2015.01)

(58) Field of Classification Search
CPC .... H04B 3/32; H04B 17/0055; H04B 1/1027; H04B 3/464
USPC .......................... 370/201; 375/227, 346, 320
See application file for complete search history.

(56) References Cited

U.S. PATENT DOCUMENTS 6,763,073 B2   7/2004   Foschini et al.
6,870,901 B1   3/2005   Gudmundsson et al.
(Continued)

OTHER PUBLICATIONS

International Search Report and Written Opinion received for PCT Application No. PCT/US2013/029886, mailed on Jun. 25, 2013, 14 Pages.
Office Action received for Taiwan Patent Application No. 102108650, mailed on Sep. 23, 2014, 4 Pages of Office Action and 4 Pages of English Translation.
(Continued)

*Primary Examiner* — Dang Ton
*Assistant Examiner* — Sai Aung
(74) *Attorney, Agent, or Firm* — Grossman, Tucker, Perreault & Pfleger, PLLC

(57) ABSTRACT

One embodiment provides a network device that includes PHY circuitry comprising transmit circuitry (Tx) and receive circuitry (Rx), wherein the Tx and Rx circuitry are configured to be coupled to a respective channel to communicate with an external device via the channels, wherein the network device configured to communicate with the external device using an Ethernet communications protocol; and test circuitry. The test circuitry is configured to: designate a through channel and at least one crosstalk channel from among the channels; determine, in the time domain, an approximate available signal voltage of a first response signal, wherein the first response signal is in response to a test signal applied to the through channel; determine a first noise profile of the first response signal in response to the test signal applied on the through channel; determine a second noise profile of a second response signal, wherein the second response signal is in response to the test signal applied on a crosstalk channel and measured on the through channel; and determine a signal-to-noise ratio of the through channel based on, at least in part, the approximate available signal voltage and the first and second noise profiles.

24 Claims, 12 Drawing Sheets

(56) References Cited

U.S. PATENT DOCUMENTS

| | | | |
|---|---|---|---|
| 7,809,336 B2 * | 10/2010 | Naguib et al. | 455/69 |
| 2007/0136012 A1 | 6/2007 | Miller | |
| 2009/0094302 A1 | 4/2009 | Hollis | |
| 2010/0046673 A1 * | 2/2010 | Li et al. | 375/320 |
| 2010/0220823 A1 * | 9/2010 | Biyani et al. | 375/346 |
| 2010/0329444 A1 * | 12/2010 | Ashikhmin et al. | 379/406.06 |
| 2011/0188561 A1 * | 8/2011 | Mizrahi et al. | 375/227 |
| 2012/0201286 A1 | 8/2012 | Pons et al. | |

OTHER PUBLICATIONS

International Preliminary Report on Patentability and Written Opinion received for PCT Patent Application No. PCT/US2013/029886, mailed on Sep. 25, 2014, 10 Pages.

Office Action received for Australia Patent Application No. 2013232410, mailed on Mar. 17, 2015, 5 pages.

Office Action received for German Patent Application No. 11 2013 001 382.7, mailed on Feb. 18, 2015, 7 pages of English translation and 14 pages of German Office Action.

* cited by examiner

DETERMINING THE SIGNAL QUALITY OF AN ELECTRICAL INTERCONNECT

This application claims the benefit of U.S. provisional application Ser. No. 61/609,804, filed Mar. 12, 2012, which is incorporated by reference in its entirety.

FIELD

The present disclosure relates to determining the signal quality of an electrical interconnect.

BACKGROUND

An electrical interconnect, or channel, in a broad sense, can exist between any two functional units, e.g., any two integrated circuits, and such functional units may have a plurality of interconnects or channels. Determining noise, and ultimately a signal-to-noise ratio (SNR), on a given channel, both as a function of the channel itself and crosstalk from other channels, has conventionally involved computationally intensive and time intensive processes that are ill-suited for changing conditions on a given channel and are incapable of providing real-time or near real-time channel quality measurements. For example, conventional approaches that use eye height/width measurements and/or frequency domain SNR calculations are typically computationally intensive processes that cannot be performed in real time. Moreover, conventional approaches to determining noise lack the accuracy and robustness needed for high speed communication networks.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure describes methods and systems for determining the signal quality of an electrical channel using a short duration test signal. The methods described herein use time-domain computations (rather than frequency-domain computations) to approximate a noise profile of a channel. The noise profile may be approximated to at least a compliance level for a given channel specification. The time-domain approaches described herein offer significant advantages over conventional channel quality metric determination processes, for example, significantly reduced processor and memory requirements.

Figure 1:
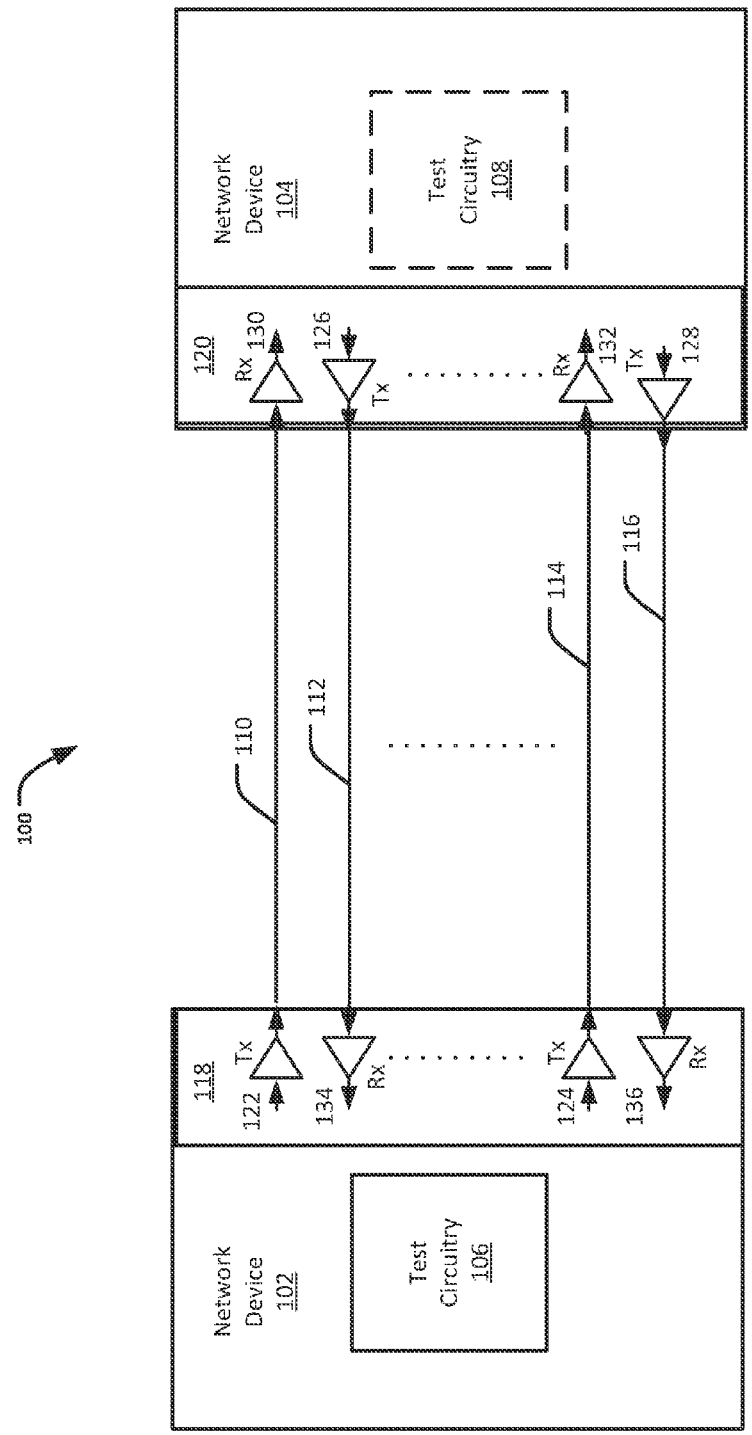
FIG. 1 illustrates a system consistent with various embodiments of the present disclosure.

FIG. 1 illustrates a system 100 consistent with various embodiments of the present disclosure. The system 100 depicted in FIG. 1 generally includes a first network device 102 and a second network device 104. The network devices 102, 104 communicate with one another over a plurality of interconnects, or channels 110, 112, . . . , 114, 116. A "channel" as used herein may be defined as any combination of wires, copper traces, connectors, packages, interposers, wire bonds, vias, cables, etc. The channels 110, 112, . . . , 114, 116 may comprise, for example, a media dependent interface that may include, for example, copper twin-axial cable, backplane traces on a printed circuit board, etc. In some embodiments, the channels 110, 112, . . . , 114, 116 may include a plurality of logical and/or physical channels (e.g. differential pair channels) that provide separate connections between the network devices 102 and 104 The system 100 may represent, for example, a network system and the network devices 102, 104 may each represent a network controller (e.g., network interface card (NIC), network interface circuitry, etc.), switch, router, network node element (e.g., server system, blade system, etc.) and/or other network device, and the following description will proceed with reference to a network system. It should be recognized, however, that the present disclosure has broad applicability to any system where communication between functional units can be advantageously enhanced by determining the channel quality of one or more channels associated with functional units.

The network devices 102, 104 may each be configured to communicate with each other using, for example, an Ethernet communications protocol. The Ethernet communications protocol may be capable permitting communication using a Transmission Control Protocol/Internet Protocol (TCP/IP). The Ethernet communications protocol may comply or be compatible with the Ethernet standard published by the Institute of Electrical and Electronics Engineers (IEEE) titled "IEEE 802.3 Standard", published in March, 2002, including all variations and/or later versions of this standard. In the examples described below, the Ethernet communications protocol may comply or be compatible with the IEEE802.3bj standard, which is an IEEE project and published as "Amendment to IEEE Standard 802.3-2008", and having an official title of "IEEE Standard for Information Technology-Telecommunications and Information Exchange Between Systems-Local and Metropolitan Area Networks-Specific Requirements Part 3: Carrier Sense Multiple Access with Collision Detection (CSMA/CD) Access Method and Physical Layer Specifications Amendment: Physical Layer Specifications and Management. Parameters for 100 Gb/s Operation Over Backplanes and Copper Cables". As stated, the present disclosure has broad applicability and may be utilized with other communications protocols, for example PCI Express, Infiniband, Fibre Channel, Thunderbolt, HDMI, etc., e.g., any communications protocol between any two functional units.

The network device 102 and 104 include respective PHY circuitry 118 and 120 generally configured to interface the network device 102 with the network device 104, via channels 110, 112, . . . , 114, 116. PHY circuitry 118/120 may comply or be compatible with, the aforementioned IEEE 802.3 Ethernet communications protocol, which may include, for example, 10GBASE-KR, 40 GBASE-KR4, 40GBASE-CR4, 100GBASE-CR10, 100GBASE-CR4, 100GBASE-KR4, and/or 100GBASE-KP4 and/or other PHY circuitry that is compliant with the aforementioned IEEE 802.3/802.3bj Ethernet communications protocol and/or compliant with an after-developed communications protocol. PHY circuitry 118 and 120 each includes transmit circuitry (Tx) 122, 124 and 126, 128 configured to transmit data packets and/or frames. PHY circuitry 118 and 120 each includes corresponding receive circuitry (Rx) 130, 132 and 134, 136 configured to receive data packets and/or frames from corresponding Tx circuitry. Of course. PHIY circuitry 118/120 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuitry 110 may include phase lock loop circuitry (PLL, not shown) configured to coordinate timing of data reception from linked Tx circuitry. The Tx and Rx circuitry may have associated signal filters, as may be defined by the aforementioned Ethernet communications protocols. The signal filters may include adjustable filters have one or more adjustable filter parameters and fixed or non-adjustable filters. Fixed filters may include, for example, a high pass filter, a low pass filter, etc. Adjustable filters may include, for example, a finite impulse response (FIR) filter, a continuous time linear filter (active and/or passive), a decision feedback equalizer (DFE) filter, a discrete time analog filter, a digital filter, etc. Adjustable filter parameters may include, for example, tap coefficients (or weights), frequency transfer function (gain or attenuation per frequency), poles and zeroes, impulse response, step response, pre-curser, post-curser, Rx gain coefficients, gain, attenuation, and/or other known or after-developed filter characteristics, etc.

The channels 110, 112, . . . , 114, 116 depicted in FIG. 1 may be represented as through channels and crosstalk channels. A "through channel" as used herein is generally defined as a low-ohmic connection between two points (e.g., direct physical connection). The through channels in FIG. 1 are represented by the direct connection of Tx/Rx circuitry: channel 110 is a through channel for Tx/Rx 122, 130; channel 112 is a through channel for Tx/Rx 126, 134; . . . ; channel 114 is a through channel for Tx/Rx 124, 132; and channel 116 is a through channel for Tx/Rx 128, 136. A "crosstalk channel" as used herein is generally defined as a high-ohmic connection between two points, and may be represented by electromagnetic noise (e.g., radio frequency noise, etc.). Crosstalk channels may be further classified as near and far crosstalk channels. A "near" crosstalk channel is defined as a channel that is relatively near to a through channel of interest (e.g., spatially near) and a "far" crosstalk channel is defined as a channel that is relatively far away from a through channel of interest (e.g., spatially remote). Taking channel 110 (Rx circuitry 130) as a through channel, for example, the near crosstalk channels are channels 112 and 116 since the Tx circuitry (126 and 128) of these channels are included with network device 104, and the far crosstalk channel is channel 114 since the Tx circuitry 124 is included with the network device 102 that is spatially remote from network device 104. Of course, this is only an example of near and far crosstalk channels, and in other embodiments, the channels may be defined in a manner consistent with a particular operating environment, noise characteristics, etc.

Network device 102 includes test circuitry 106 configured to test the quality of at least one channel 110, 112, . . . , 114, 116 coupled thereto. In some embodiments, network device 102 may also include test circuitry 108 configured to test the quality of at least one channel 110, 112, . . . , 114, 116 coupled thereto. In operation, the test circuitry 106 and/or 108 is configured to designate a through channel, generate a test signal on the designated through channel and at least one crosstalk channel, measure the electrical characteristics of the through channel in response to the test signal on the through channel, and measure the electrical characteristics of the through channel in response to the test signal on one or more crosstalk channels. The electrical characteristics may include, for example, noise, distortion, loss, dispersion, etc., and/or other known or later-discovered attributes that affect the signal quality of a channel. The electrical characteristics may be evaluated in terms of noise. In addition, the test circuitry 106/108 is configured to convert the electrical characteristics of the through channels and the crosstalk channels into a collection of pulse responses, and evaluate the pulse responses in the time domain to determine, for example, the signal-to-noise (SNR) on the through channel, using the methodology described below.

Through Channel Response and Noise Determination

Figure 2:
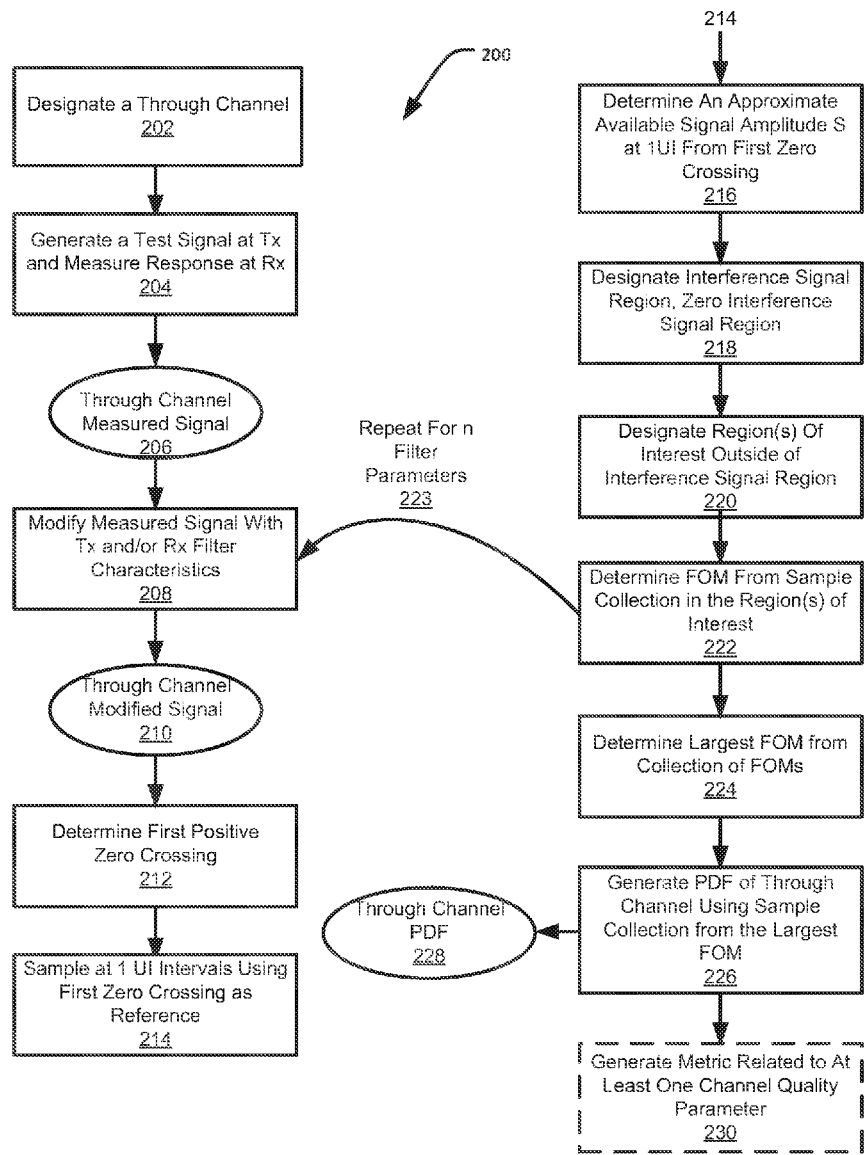
FIG. 2 is a flowchart of operations according to one embodiment of the present disclosure.

FIG. 2 is a flowchart of operations 200 according to one embodiment of the present disclosure. In particular, the flowchart 200 illustrates test circuitry operations of a determining the response, to a test signal, of a designated through channel and determining at least one noise characteristic associated with the through channel. With continued reference to FIG. 1, operations of this embodiment include designating a through channel 202. For consistency with the example described above, it will be assumed that channel 110 is the through channel, and all other channels (112, . . . , 114, 116) are crosstalk channels. Operations also include generating a test signal at the transmit (Tx) circuitry of the designated through channel, and measuring the response to the test signal at the receive (Rx) circuitry of the through channel 204, thus obtaining a through channel measured signal 206. For example, test circuitry 104 may be configured to instruct test circuitry 102 to generate a test signal on the through channel 110. The test signal may include, for example, an isolated symbol or a series of symbols having a known length. A "symbol" is one of a few known waveforms with a fixed duration, denoted "unit interval" (UI), which encodes information sent from the Tx circuitry. For example, a pulse amplitude modulation (PAM) signal, consistent with the aforementioned Ethernet communications protocol, encodes a bit (either one or zero) as a constant voltage level (a choice of one of two possible voltages), or similarly a pair of bits as a choice of one of four possible voltages, driven for a duration of 1 UI. Operations may also include modifying the measured signal with at least one adjustable parameter of at least one signal filter associated with the Tx and/or Rx circuitry 208 to obtain a through channel modified signal 210. The Tx and/or Rx signal filters may be defined by one or more preset functions and/or coefficients, as may be defined in the aforementioned Ethernet communications protocol, and may be represented as a mathematical expression, as may be defined by the aforementioned Ethernet communications protocol.

Figure 3:
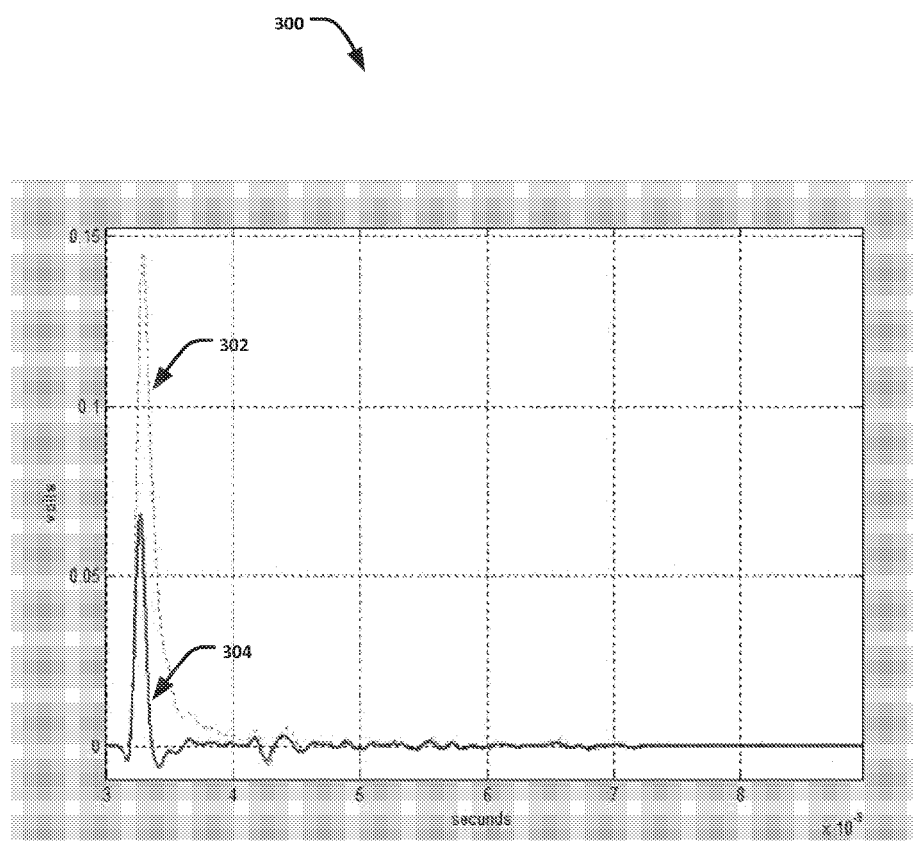
FIG. 3 illustrates a signal plot of the measured signal and the modified signal of the through channel according to one embodiment of the present disclosure.

The concepts of the operations 204-210 are illustrated in FIG. 3. FIG. 3 illustrates a signal plot 300 of the measured signal 302 and the modified signal 304 of the through channel according to one embodiment of the present disclosure. The signal plot 300 is a plot of signal amplitude verses time. The measured signal 302 represents the test signal, as measured by the Rx circuitry. The modified signal 304 represents the modification of the measured signal 302, as modified by at least parameter of at least one signal filter associated with the Tx and/or Rx circuitry of the through channel. Generally, the available signal amplitude of the measured signal 302 is greater than the available signal amplitude of the modified signal 304. The Tx and/or Rx circuitry may cause the test signal to "spread" in time, and thus, the resulting measured and modified signals are generally longer than 1 UI, and may be as long as the memory size associated with the through channel. In this example, 1 UI may be on the order of 20-60 picoseconds, but the measured and modified signals may be orders of magnitude longer (e.g., several nanoseconds).

Referring again to FIG. 2, and with continued reference to FIG. 1, operations of this embodiment may further include determining the first positive zero crossing of the modified signal 212. Operations may also include sampling the modified signal using the first positive zero crossing as a reference 214. In some embodiments, the sampling rate may be selected to be approximately the UI time, to correspond with the test signal attributes. Operations may also include determining a signal amplitude, S, at 1 IU interval from the first zero crossing 216. Operations may also include designating an interference signal region within the sampled modified signal 218. The interference signal region may be selected as a selected number of UI samples from the first positive zero crossing, in either the positive or negative time direction. In some embodiments, the interference signal region may be based the number of "taps" set by the DFE, as may be defined by the aforementioned Ethernet communications protocol. The DFE is typically configured to predict, based on previously detected symbols, inter-symbol interference that may affect a current symbol. The time of this interference is typically defined as taps, and the DFE is also configured to cancel, in whole or in part, the inter-symbol interference within the time period specified by the taps. "Compliant" Rx circuitry may be defined, at least in part, by the number of taps, and "compliant" may be defined by the aforementioned Ethernet communications protocol This operation may also include zeroing the amplitude values of the samples in the interference region 218. Operations may also include designating at least one region of interest outside of the interference signal region 220. The at least one region of interest is generally considered noise. Operations according to this embodiment may also include determining a figure of merit (FOM), based on, at least in part, the noise samples in the at least one region of interest 222 (noise samples in this region are also referred to herein as "ISC"). In some embodiments, the FOM may also be based on other noise sources, referred to herein as ONS. The ONS may include, for example, jitter, Rx circuitry voltage gain noise, external RF interference, power supply and/or line supply noise, cosmic radiation, and/or other noise sources, as may be defined by the aforementioned Ethernet Protocol. The ONS may be represented as a root-mean-square (RMS) value, function, coefficient, mathematical expression, etc. The FOM may represent a signal-to-noise ratio (S/N or SNR) of the modified signal, and may be generated by evaluating the following equation:

$$FOM = S/\sqrt{(\Sigma ISC^2 + ONS^2)}.$$

Figure 4:
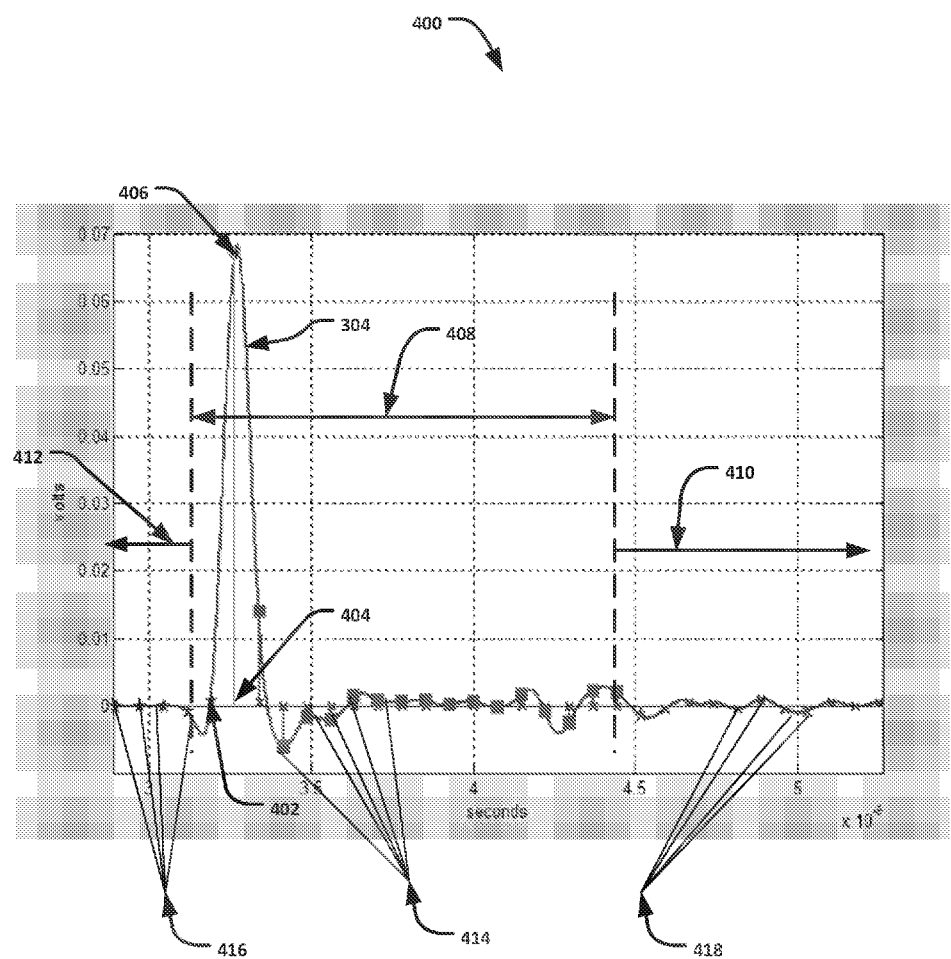
FIG. 4 illustrates a signal plot of sampling of the modified signal of the through channel according to one embodiment of the present disclosure.

The concepts of the operations 212-222 are illustrated in FIG. 4. FIG. 4 illustrates a signal plot 400 of sampling of the modified signal 304 of the through channel according to one embodiment of the present disclosure. The first positive zero crossing 402 is used as a sampling reference. The signal amplitude 406 (S) is determined at 1 UI 404 from the first zero crossing 402. The entire waveform is sampled at 1 UI intervals, shown as example samples 414, 416 and 418, using the first zero crossing 402 as a reference. The interference signal region 408 includes the collection of samples 414. In this example, two regions of interest 410 and 412 are defined, outside the interference signal region 408. The samples in the regions of interest 410 and 412 represent noise associated with the modified signal 304, and are used to determine the FOM, as described above.

Referring again to FIG. 2, and with continued reference to FIG. 1, since at least one signal filter may include more than one adjustable filter parameter setting, operations 208-222 may be repeated for each of n adjustable signal filter parameters, thus generating n number of FOMs, one for each of the n adjustable filter parameters 223. Operations of this embodiment may also include determining the largest FOM from the collection of n FOMs 224. The largest FOM generally represents the largest signal-to-noise ratio of the collection of n FOMs. Thus, the adjustable filter setting that yields the largest FOM may also yield the lowest number of probability of data errors. Operations of this embodiment also include generating a noise profile of the through channel 226. In one example embodiment, the noise profile may include generating a probability density function (PDF) of the through channel using the samples that generated the largest FOM 226, and thus obtaining a through channel noise PDF 228. Generally, the through channel noise PDF represents the probabilities of noise voltage values. Operations of this embodiment may also include generating a metric related to at least one channel quality parameter, based on the through channel noise PDF 230. The metric may include, for example, a noise metric $N_{TC}$ (noise of the through channel). $N_{TC}$ may be determined, for example, by converting the PDF into a cumulative density function (CDF), determining the probability of the CDF that is equal to (or approximately equal to) a target metric, and determining a voltage associated with the probability. The target metric may include, for example, a symbol error ratio (SER. e.g. $10^{-5}$), as may be defined by the aforementioned Ethernet Protocol.

Figure 5:
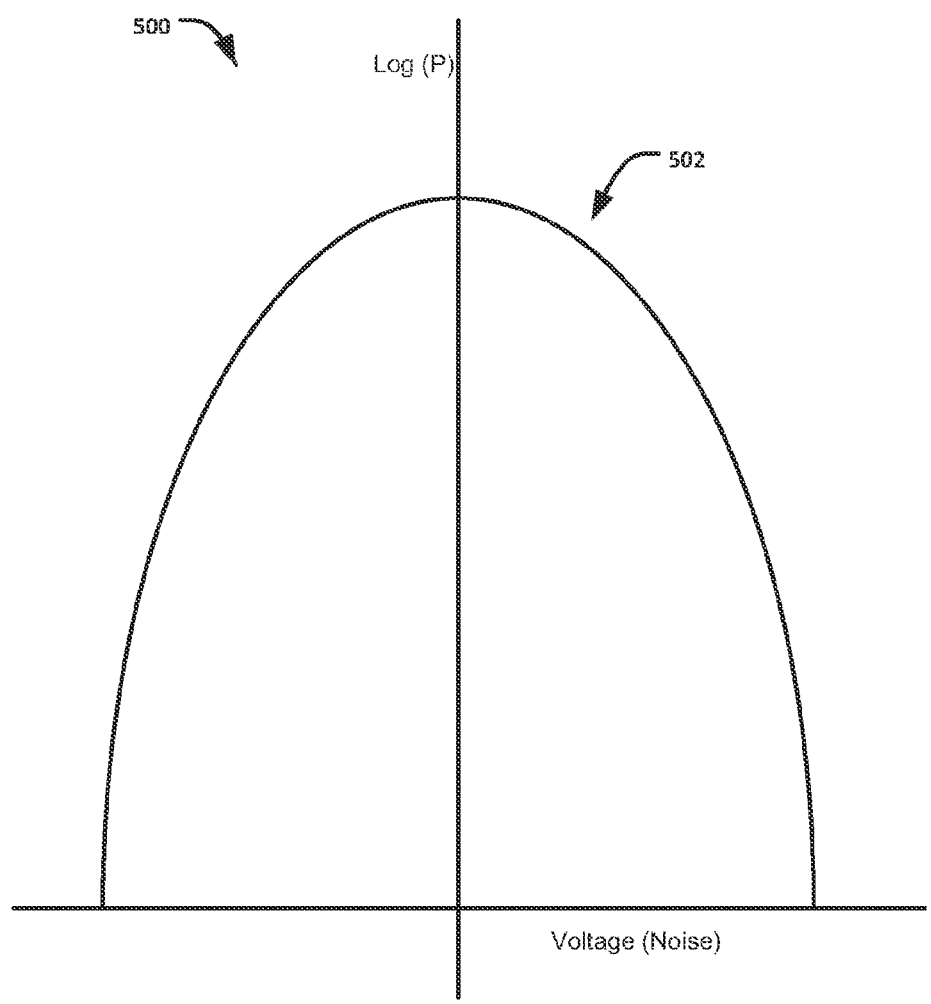
FIG. 5 illustrates an example PDF plot of the through channel according to one embodiment of the present disclosure.

FIG. 5 illustrates an example PDF plot 500 of the through channel noise according to one embodiment of the present disclosure. The x-axis is noise voltage (magnitude) and the y-axis is the log of P, where P represents the probability of a voltage existence if the Tx circuitry is generating pseudorandom symbols. The PDF graph 502 is generally parabolic, and represents the probability of a certain voltage of noise.

Crosstalk Channel Response and Noise Determination

Figure 6:
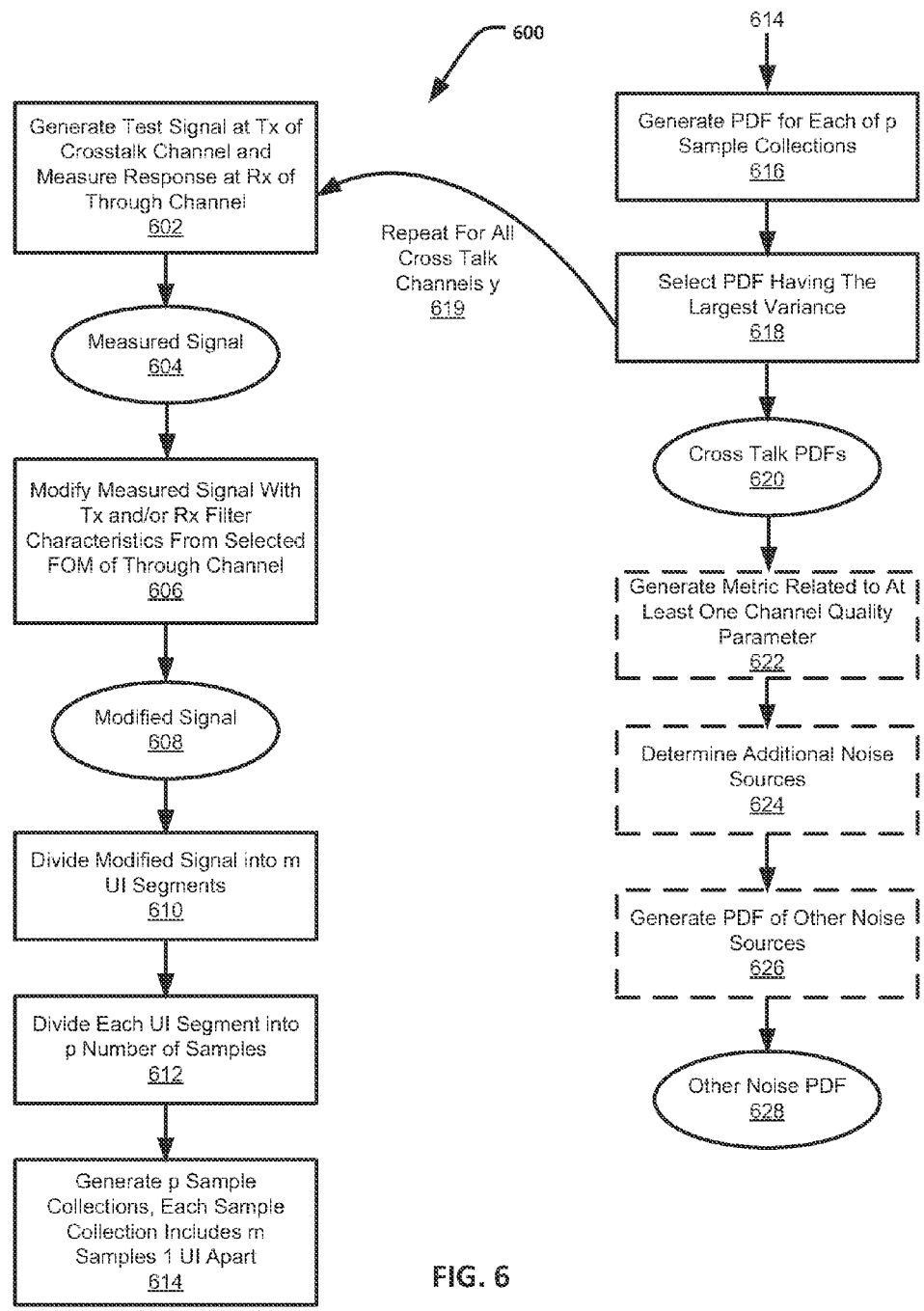
FIG. 6 is a flowchart of operations according to another embodiment of the present disclosure.

FIG. 6 is a flowchart of operations 600 according to another embodiment of the present disclosure. In particular, the flowchart 600 illustrates test circuitry operations of a determining the response, to a test signal, of at least one crosstalk channel and determining at least one noise characteristic associated with the crosstalk channel. With continued reference to FIG. 1, operations of this embodiment include generating the test signal at the Tx circuitry of a designated crosstalk channel and measure the response at the Rx circuitry of the through channel 602, thus obtaining a measured crosstalk signal 604. Operations may also include modifying the measured crosstalk signal with the Tx and/or Rx filter characteristics and parameters that generated the largest FOM of the through channel (described above) 608, thus generated a modified crosstalk signal 608. Operations may also include dividing the modified crosstalk signal into a plurality (m) UI segments 610, where m is generally defined by the overall time length of the modified crosstalk signal. Operations may further include dividing each UI segment into p number of samples 612. The number p may be selected based on, for example, a resolution of the modified crosstalk signal that reasonably ensures that available signal voltage values within each UI segment are sampled. In some embodiments, the number p may be defined (as a suggested minimum) by the aforementioned Ethernet communications protocol. Operations may also include generating p sample collections, each sample collection includes m samples 1 UI apart 614.

Figure 7:
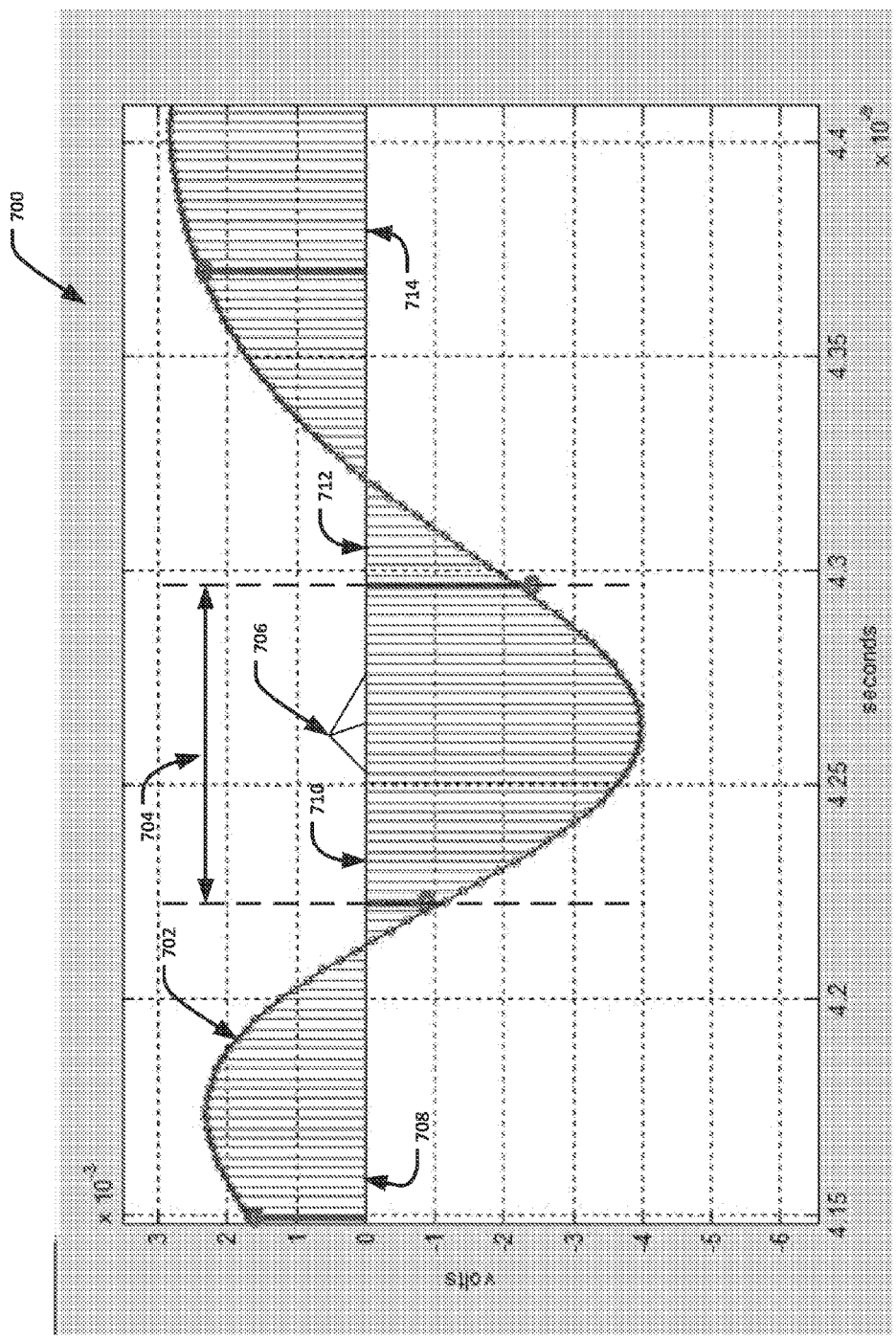
FIG. 7 illustrates a signal plot of a portion of the modified crosstalk signal of the crosstalk channel according to one embodiment of the present disclosure.

The concepts of the operations 610-614 are illustrated in FIG. 7. FIG. 7 illustrates a signal plot 700 of a portion of the modified crosstalk signal 702 of the crosstalk channel according to one embodiment of the present disclosure. The signal 702 is divided up into m UI segments, one of which is shown at 704. Each of the m UI segments is further divided into p number of samples, a few of such samples are shown at 706. Sample collections may be generated using a sample from each UI segment, spaced 1 UI apart. Thus for example, samples 708, 710, 712 and 714 may form part of a sample collection for the portion of the modified crosstalk signal 702.

Referring again to FIG. 6, and with continued reference to FIG. 1, operations of this embodiment may also include generating a noise profile for each of the p sample collections 616. In one example embodiment, the noise profile may include generating a PDF for each of the p sample collections 616 Operations may further include selecting, among the p number of PDFs, the PDF having a metric that suggests a worst-case noise profile. In some embodiments, the metric used here is variance, and thus, the PDF having the largest variance may be selected 618. Since there may be a plurality of crosstalk channels (y), operations 602-618 may be repeated for each of the y crosstalk channels, thus generating y number of crosstalk PDFs 620. Operations of this embodiment may also include generating a metric related to at least on channel quality parameter, based on the crosstalk PDFs 622. Similar to the embodiment of FIG. 2, the metric may include, for example, a noise metric $N_y$ (noise of the crosstalk channel). $N_y$ may be determined, for example, by converting the PDF into a cumulative density function (CDF), determining the probability of the CDF that is equal to (or approximately equal to) a target metric, and determining a voltage associated with the probability. The target metric may include, for example, a symbol error ratio (SER, e.g., $10^{-5}$), as may be defined by the aforementioned Ethernet Protocol. Operations of this embodiment may also include generating one or more PDFs of other noise sources 626, thus obtaining other noise PDF 628.

Figure 8:
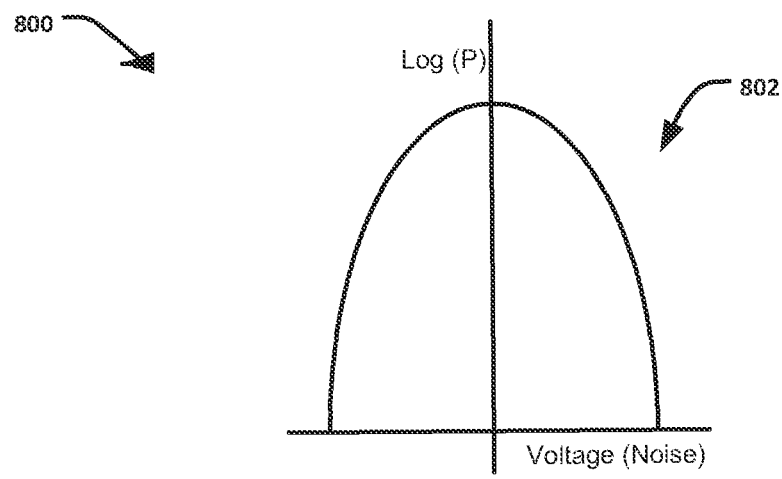
FIG. 8 illustrates example PDF plots of the crosstalk channels according to one embodiment of the present disclosure.
Figure 8:
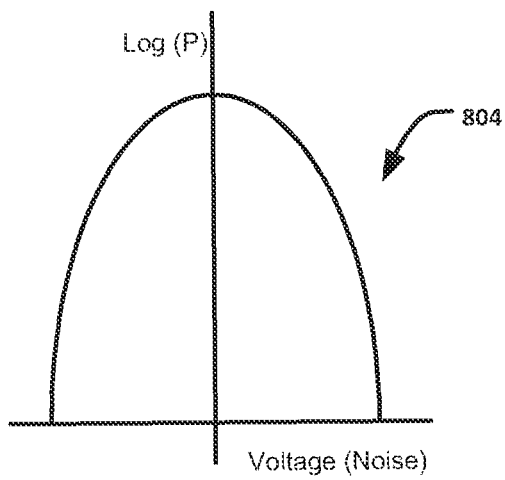
Figure 8:
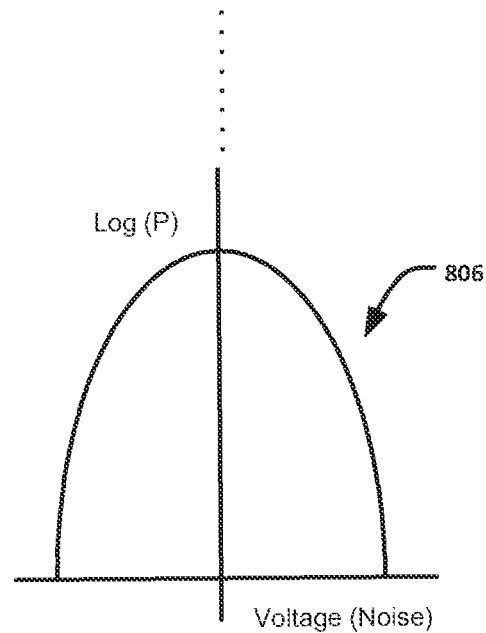

FIG. 8 illustrates example PDF plots 800 of the crosstalk channels according to one embodiment of the present disclosure. Each of the PDF plots 802, 804, . . . , 806 represent selected PDFs of each of the y crosstalk channels, i.e. each PDF represents the largest variance of the sample collections for each crosstalk channel, as described above.

Combining PDFs and Determining Through Channel SNR

Figure 9:
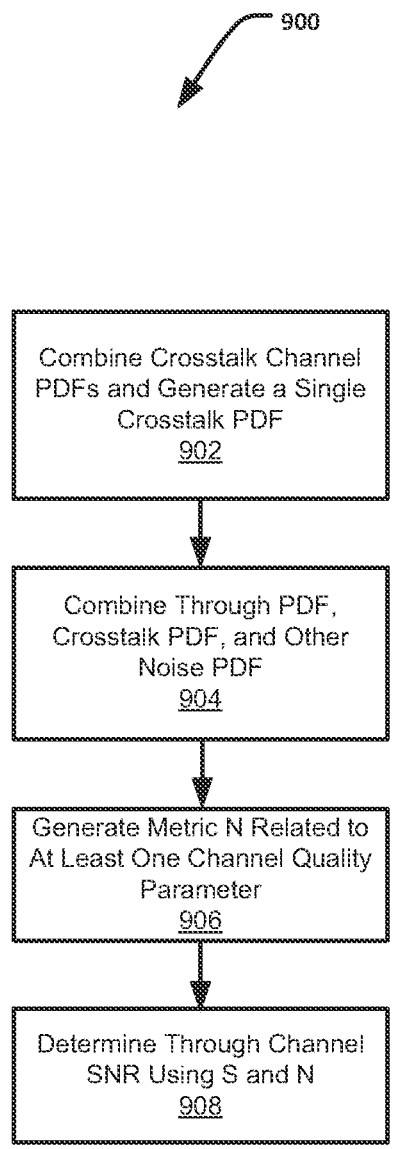
FIG. 9 is a flowchart of operations according to another embodiment of the present disclosure.

FIG. 9 is a flowchart of operations 900 according to another embodiment of the present disclosure. In particular, the flowchart 900 illustrates test circuitry operations of a combining noise profiles generated for the through channel and at least one crosstalk channel, and determining the signal-to-noise ratio of the through channel. Operations of this embodiment include combining crosstalk channel PDFs and generating a single crosstalk PDF 902. Combining PDFs may be performed using known and/or after-developed convolution methods. In some embodiments, one or more subsets of the crosstalk PDFs may be combined to generate one or more intermediate PDFs. For example, the near crosstalk PDFs may be combined to generate a total near crosstalk PDF, and the far crosstalk PDFs may be combined to generate a total far crosstalk PDF. This may enable, for example, a determination of the relative contribution of noise from the near and far crosstalk channels. Of course, this is only an example of the different combinations of crosstalk PDFs that may be generated according to the teachings of the present disclosure, and other example combinations may generate useful noise information, either as a final result or an intermediate operation. Operations of this embodiment may also include combining the through channel PDF, at least one resultant crosstalk PDF, and, in some embodiments, at least one other noise source PDF 904. Operations of this embodiment may also include generating a noise metric N related to at least one channel quality parameter 906, based on the combined PDFs of the through channel, at least one crosstalk channel, and, in some embodiments at least one other noise source PDF. Here, N may represent the overall noise from all relevant noise sources. Operations of this embodiment may also include determining the through channel SNR using S and N 908. In one example embodiment, a channel operating margin (COM) may be determined as:

COM=20 log($S/N$).

The SNR and/or COM may be used to determine whether or not the through channel is compliant with the aforementioned Ethernet communications protocol. Thus, the test circuitry of the present disclosure permits isolated testing of individual channels to determine, for example, if the channel itself is compliant. In addition, the signal manipulation operations of any of the embodiments herein may be evaluated in the time domain directly, thus providing significant processor overhead and memory requirement savings. In addition, generating intermediate noise metrics (e.g., $N_{TC}$ and/or $N_y$) may enable an analysis of individual and/or lumped noise sources for troubleshooting, etc.

Figure 10:
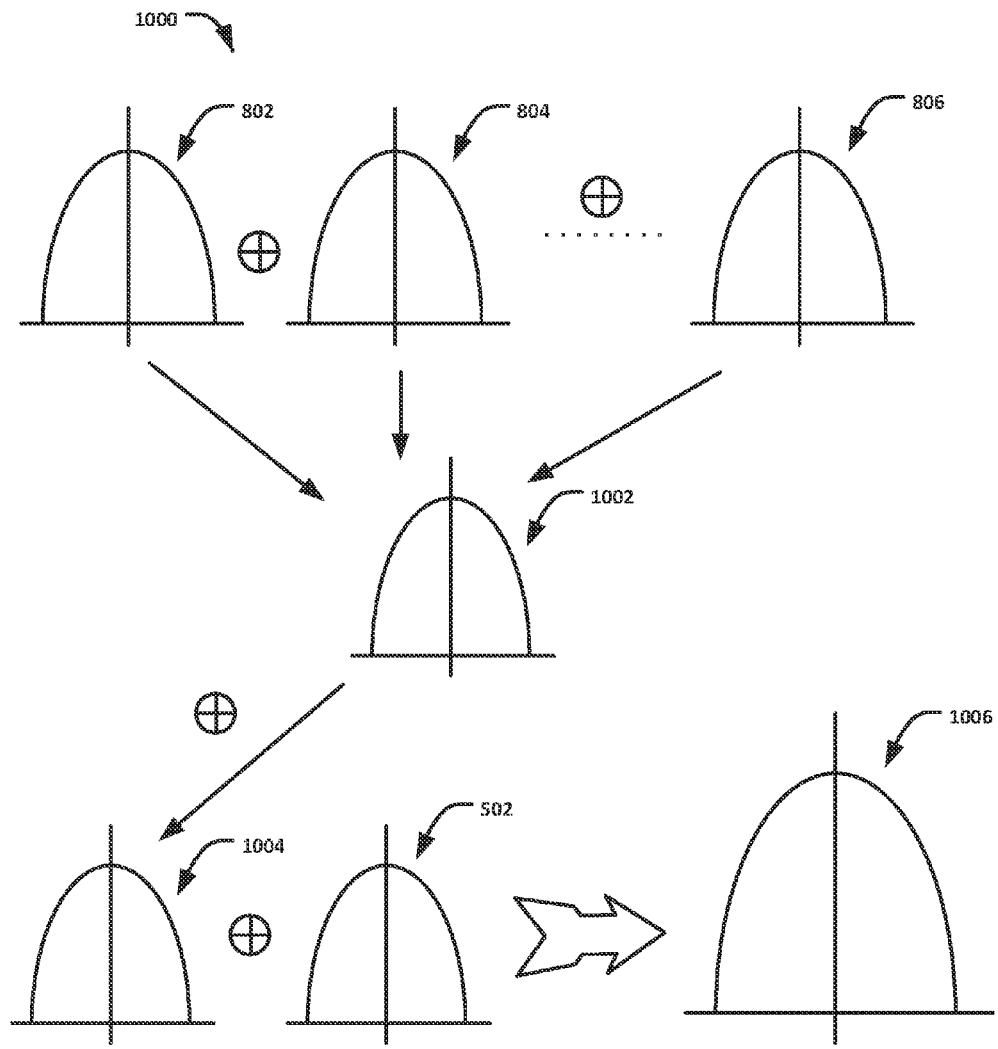
FIG. 10 illustrates example combinations of PDF plots according to one embodiment of the present disclosure.

The concepts of the operations 902-906 are illustrated in FIG. 10. FIG. 10 illustrates example combinations of PDFs according to one embodiment of the present disclosure. In this example, a plurality of crosstalk channel PDFs 802, 804, . . . , 806 may be combined, i.e., convolved, to form a single crosstalk PDF 1002. The single crosstalk PDF 1002 may be convolved with the other noise source PDF 1004 and the through channel PDF 502, to form the total noise PDF 1006.

Figure 11:
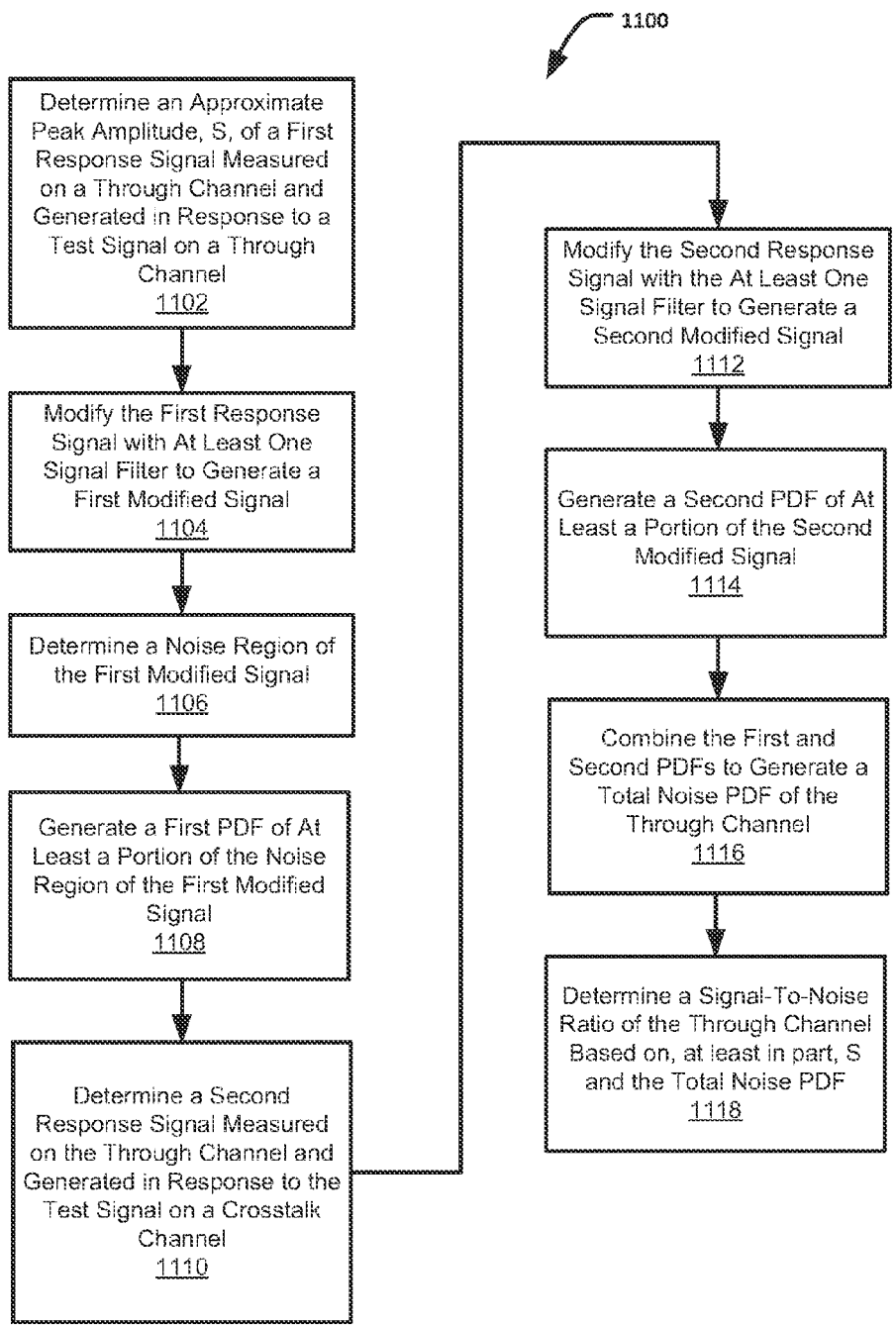
FIG. 11 is a flowchart of operations according to another embodiment of the present disclosure.

FIG. 11 is a flowchart of operations 1100 according to another embodiment of the present disclosure. In particular, the flowchart 1100 illustrates test circuitry operations of determining the signal-to-noise ratio of the through channel. Operations of this embodiment include determining an approximate available signal amplitude, S, of a first response signal that is measured on a through channel and generated in response to a test signal on the through channel 1102. Operations of this embodiment also include modifying the first response signal with at least one signal filter to generate a first modified signal 1104. Operations of this embodiment also include determining a noise region of the first modified signal 1106. Operations may also include generating a first probability density function (PDF) of at least a portion of the noise region of the first modified signal 1108. Operations of this embodiment also include determining a second response signal that is measured on the through channel and generated in response to the test signal on a crosstalk channel 1110. Operations of this embodiment also include modifying the second response signal with the at least one signal filter to generate a second modified signal 1112. Operations of this embodiment also include generating a second PDF of at least a portion of the second modified signal 1114. Operations of this embodiment also include combining the first and second PDFs to generate a total noise PDF of the through channel 1116. Operations of this embodiment also include determining a signal-to-noise ratio of the through channel based on, at least in part, S and the total noise PDF 1118.

Figure 12:
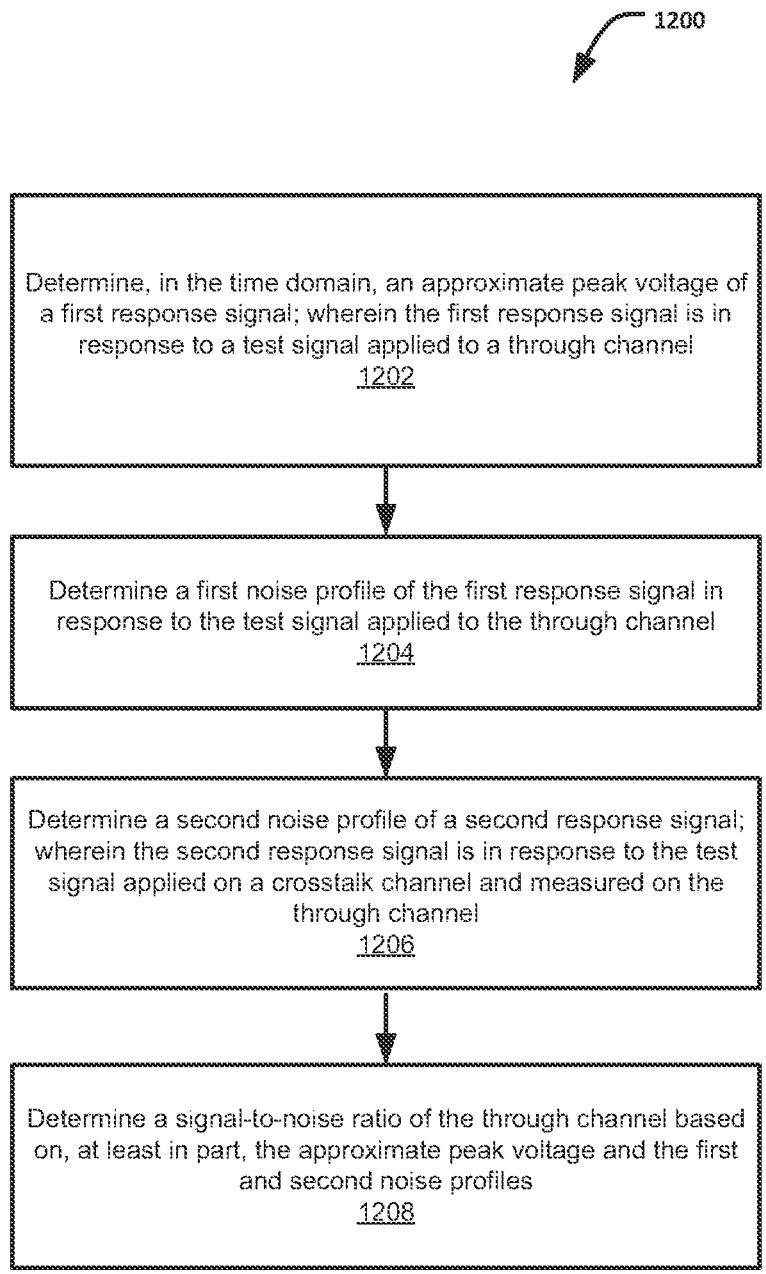
FIG. 12 is a flowchart of operations according to another embodiment of the present disclosure.

FIG. 12 is a flowchart of operations 1200 according to another embodiment of the present disclosure. In particular, the flowchart 1200 illustrates operations of determining the signal-to-noise ratio of the through channel. Operations of this embodiment include determining, in the time domain, an approximate available signal voltage of a first response signal; wherein the first response signal is in response to a test signal applied to a through channel 1202. Operations of this embodiment also include determining a first noise profile of the first response signal in response to the test signal applied to the through channel 1204. Operations of this embodiment also include determining a second noise profile of a second response signal; wherein the second response signal is in response to the test signal applied on a crosstalk channel and measured on the through channel 1206. Operations of this embodiment also include determining a signal to noise ratio of the through channel based on, at least in part, the approximate available signal amplitude and the first and second noise profiles 1208.

While the flowcharts of FIGS. 2, 6, 9, 11 and 12 illustrate operations according various embodiments, it is to be understood that not all of the operations depicted in FIGS. 2, 6, 9, 11 and/or 12 are necessary for other embodiments. In addition, it is fully contemplated herein that in other embodiments of the present disclosure, the operations depicted in FIGS. 2, 6, 9, 11 and/or 12, and/or other operations described herein may be combined in a manner not specifically shown in any of the drawings, and such embodiments may include less or more operations than are illustrated in FIGS. 2, 6, 9, 11 and/or 12. Thus, claims directed to features and/or operations that are not exactly shown in one drawing are deemed within the scope and content of the present disclosure.

The foregoing is prided as exemplary system architectures and methodologies, modifications to the present disclosure are possible. For example, the test circuitry 106 and/or 108 may, in other embodiments, form part of external test equipment (not shown), rather than being part of the network device 102 and/or 104. The test equipment may be used to determine the signal quality of one or more channels, which may be performed prior to or after one or more functional units (e.g., network devices, etc.) are coupled to the channel. The test equipment may be configured to emulate Tx and Rx circuitry, emulate adjustable and fixed filters associated therewith, generate and receive test signals, and/or other functions or operations as may defined by the aforementioned Ethernet communications protocol. Other modifications are also possible. For example, device 102 and/or 104 may also include a host processor, chipset circuitry and system memory. The host processor may include one or more processor cores and may be configured to execute system software. System software may include, for example, operating system code (e.g., OS kernel code) and local area network (LAN) driver code. LAN driver code may be configured to control, at least in part, the operation of the network device 102/104. System memory may include I/O memory buffers configured to store one or more data packets that are to be transmitted by, or received by, network device 102/104. Chipset circuitry may generally include "North Bridge" circuitry (not shown) to control communication between the processor, network device 102/104 and system memory.

Network device 102 and/or 104 may further include an operating system (OS, not shown) to manage system resources and control tasks that are run on, e.g., device 102/104. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network device 102/104. The TCP offload engine circuitry may be configured to provide, for example, packet transport, packet segmentation, packet reassembly, error checking, transmission acknowledgements, transmission retries, etc., without the need for host CPU and/or software involvement.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

"Circuitry", as used in any embodiment herein, may comprise, for example, singly or in any combination, hardwired circuitry, programmable circuitry, state machine circuitry, and/or firmware that stores instructions executed by programmable circuitry. Circuitry may be embodied as a semiconductor integrated circuit (IC) which may include an application-specific IC (ASIC), system on chip (SoC), filed programmable gate array (FPGA), digital signal processor (DSP), dedicated and/or off-the-shelf processor, etc.

Embodiments of the operations described herein may be implemented in a system that includes one or more storage mediums having stored thereon, individually or in combination, instructions that when executed by one or more processors perform the methods. The processor may include, for example, a processing unit and/or programmable circuitry in the network controller 104 and/or other processing unit or programmable circuitry. Thus, it is intended that operations according to the methods described herein may be distributed across a plurality of physical devices, such as processing structures at several different physical locations. The storage medium may include any type of tangible, non-transitory storage medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

In some embodiments, a hardware description language may be used to specify circuit and/or logic implementation for the various operations and/or circuitry described herein. For example, in one embodiment the hardware description language may comply or be compatible with a very high speed integrated circuits (VHSIC) hardware description language (VHDL) that may enable semiconductor fabrication of one or more circuits and/or modules described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

"Circuitry", as used in any embodiment herein, may comprise, for example, singly or in any combination, hardwired circuitry, programmable circuitry, state machine circuitry, and/or firmware that stores instructions executed by programmable circuitry. Circuitry may be embodied as a semiconductor integrated circuit (IC) which may include an application-specific IC (ASIC), system on chip (SoC), filed programmable gate array (FPGA), digital signal processor (DSP), dedicated and/or off-the-shelf processor, etc. Any operation described herein, or any subset or combination thereof, may be embodied as a module. A "module" may include, for example, an application, instruction set, executable code, etc. and/or circuitry, etc. that is configured to perform a stated function.

Accordingly, one example of the present disclosure is a network device that includes PHY circuitry comprising transmit circuitry (Tx) and receive circuitry (Rx), wherein the Tx and Rx circuitry are configured to be coupled to a respective channel to communicate with an external device via the channels, wherein the network device configured to communicate with the external device using an Ethernet communications protocol; and test circuitry. The test circuitry is configured to: designate a through channel and at least one crosstalk channel from among the channels: determine an approximate available signal amplitude, S, of a first response signal that is measured on the through channel and generated in response to a test signal on the through channel; modify the first response signal with at least one signal filter to generate a first modified signal; determine a noise region of the first modified signal; generate a first probability density function (PDF) of at least a portion of the noise region of the first modified signal; determine a second response signal that is measured on the through channel and generated in response to the test signal on a crosstalk channel; modify the second response signal with the at least one signal filter to generate a second modified signal; generate a second PDF of at least a portion of the second modified signal; combine the first and second PDFs to generate a total noise PDF of the through channel; and determine a signal-to-noise ratio of the through channel based on, at least in part, S and the total noise PDF.

Another example network device includes any or all of the foregoing components wherein the signal filter includes a filter associated with the Tx and/or Rx circuitry.

Another example network device includes any or all of the foregoing components wherein the test circuitry is further configured to modify the first measured signal with a plurality of adjustable filter setting and, for each adjustable filter setting: generate a plurality of modified signals, one for each adjustable filter setting; for each modified signal, sample the signal at a sampling rate that is based on the test signal; for each modified signal, determine an approximate available signal amplitude; for each modified signal, determine a noise region; for each modified signal, determine a signal-to-noise ratio based on, at least in part, the available signal amplitude and the noise region; and select one of the modified signals having the largest signal-to-noise ratio; and wherein the first PDF is generated using the selected modified signal.

Another example network device includes any or all of the foregoing components wherein the test circuitry is further configured to: determine a first positive zero crossing of the first modified signal; sample the first modified signal at a sampling rate that based on the test signal; and designate a portion of the first modified signal as an interference signal region, wherein the interference signal region is based on at least one parameter of the Rx circuitry and the noise region is outside of the interference region.

Another example network device includes any or all of the foregoing components wherein the test circuitry is further configured to: determine, for each of a plurality of crosstalk channels, a plurality of corresponding response signals that are each measured on the through channel and generated in response to the test signal on each of the plurality of crosstalk channel; for each of the plurality of response signals, modify the response signal with the at least one signal filter to generate a modified signal; for each of the plurality of response signals, generate a PDF of at least a portion of the modified signal; and select, from among the plurality of response signal PDFs, the PDF having the largest variance.

Another example network device includes any or all of the foregoing components wherein the test circuitry is further configured to: generate a third PDF associated with at least one additional noise source; and determine the signal-to-noise ratio of the through channel based on the first, second and third PDFs.

Another example network device includes any or all of the foregoing components wherein the test circuitry is further configured to generate a metric related to at least one channel quality parameter, based on the total noise PDF; wherein the metric is a noise metric that is based on a target metric defined by the Ethernet communications protocol.

Another example network device includes any or all of the foregoing components wherein the target metric is a symbol error ratio (SER), and wherein the metric is used for a compliance measure, defined by the Ethernet communications protocol, for the channel quality of the through channel.

Another example of the present disclosure is a method for determining a signal-to-noise ratio of a through channel, wherein the through channel provides a communications path between a first device and a second device and first and second devices are configured to communicate with each other using an Ethernet communications protocol, the method comprising: determining an approximate available signal amplitude, S, of a first response signal that is measured on the through channel and generated in response to a test signal on the through channel; modifying the first response signal with at least one signal filter to generate a first modified signal; determining a noise region of the first modified signal; generating a first probability density function (PDF) of at least a portion of the noise region of the first modified signal; determining a second response signal that is measured on the through channel and generated in response to the test signal on a crosstalk channel; modifying the second response signal with the at least one signal filter to generate a second modified signal; generating a second PDF of at least a portion of the second modified signal; combining the first and second PDFs to generate a total noise PDF of the through channel; and determining a signal-to-noise ratio of the through channel based on, at least in part, S and the total noise PDF.

Another example method includes any or all of the foregoing operations wherein the signal filter includes a filter associated with the transmit circuitry (Tx) and/or receive circuitry (Rx) coupled to the through channel.

Another example method includes any or all of the foregoing operations and further includes modifying the first measured signal with a plurality of adjustable filter setting and, for each adjustable filter setting; generating a plurality of modified signals, one for each adjustable filter setting; for each modified signal, sampling the signal at a sampling rate that is based on the test signal; for each modified signal, determining an approximate available signal amplitude; for each modified signal, determining a noise region; for each modified signal, determining a signal-to-noise ratio based on, at least in part, the available signal amplitude and the noise region; and selecting one of the modified signals having the largest signal-to-noise ratio; and wherein the first PDF is generated using the selected modified signal.

Another example method includes any or all of the foregoing operations and further includes determining a first positive zero crossing of the first modified signal; sampling the first modified signal at a sampling rate that based on the test signal; and designating a portion of the first modified signal as an interference signal region, wherein the interference signal region is based on at least one parameter of receive circuitry coupled to the through channel and the noise region is outside of the interference region.

Another example method includes any or all of the foregoing operations and further includes determining, for each of a plurality of crosstalk channels, a plurality of corresponding response signals that are each measured on the through channel and generated in response to the test signal on each of the plurality of crosstalk channel; for each of the plurality of response signals, modifying the response signal with the at least one signal filter to generate a modified signal; for each of the plurality of response signals, generating a PDF of at least a portion of the modified signal; and selecting, from among the plurality of response signal PDFs, the PDF having the largest variance.

Another example method includes any or all of the foregoing operations and further includes generating a third PDF associated with at least one additional noise source; and determining the signal-to-noise ratio of the through channel based on the first, second and third PDFs.

Another example method includes any or all of the foregoing operations and further includes generating a metric related to at least one channel quality parameter, based on the total noise PDF; wherein the metric is a noise metric that is based on a target metric defined by the Ethernet communications protocol.

Another example method includes any or all of the foregoing operations wherein the target metric is a symbol error ratio (SER), and wherein the metric is used for a compliance measure, defined by the Ethernet communications protocol, for the channel quality of the through channel.

Another example method includes any or all of the foregoing operations and further includes a system comprising one or more non-transitory storage devices having stored thereon, individually or in combination, instructions that when executed by one or more processors result in the following operations comprising: any of the previous operations.

Another example of the present disclosure is a network device that includes PHY circuitry comprising transmit circuitry (Tx) and receive circuitry (Rx), wherein the Tx and Rx circuitry are configured to be coupled to a respective channel to communicate with an external device via the channels, wherein the network device configured to communicate with the external device using an Ethernet communications protocol; and test circuitry configured to: designate a through channel and at least one crosstalk channel from among the channels; determine, in the time domain, an approximate available signal voltage of a first response signal, wherein the first response signal is in response to a test signal applied to the through channel; determine a first noise profile of the first response signal in response to the test signal applied on the through channel; determine a second noise profile of a second response signal, wherein the second response signal is in response to the test signal applied on a crosstalk channel and measured on the through channel; and determine a signal-to-noise ratio of the through channel based on, at least in part, the approximate available signal voltage and the first and second noise profiles.

Another example network device includes any or all of the foregoing components wherein the signal filter includes a filter associated with the Tx and/or Rx circuitry.

Another example network device includes any or all of the foregoing components wherein the test circuitry is further configured to modify the first response signal with a plurality of adjustable filter setting and, for each adjustable filter setting: generate a plurality of modified signals, one for each adjustable filter setting; for each modified signal, sample the signal at a sampling rate that is based on the test signal; for each modified signal, determine an approximate available signal amplitude; for each modified signal, determine a noise region; for each modified signal, determine a signal-to-noise ratio based on, at least in part, the available signal amplitude and the noise region; and select one of the modified signals having the largest signal-to-noise ratio; and wherein the first noise profile is generated using the selected modified signal.

Another example network device includes any or all of the foregoing components wherein the test circuitry is further configured to determine the first noise profile is determined by: determine a first positive zero crossing of the first response signal; sample the first response signal at a sampling rate that based on the test signal; and designate a portion of the first response signal as an interference signal region, wherein the interference signal region is based on at least one parameter of the Rx circuitry and the noise profile is determined based on a region of the first response signal that is outside of the interference region.

Another example network device includes any or all of the foregoing components wherein the test circuitry is further configured to: determine the second noise profile by determining, for each of a plurality of crosstalk channels, a plurality of corresponding response signals that are each measured on the through channel and generated in response to the test signal on each of the plurality of crosstalk channels; for each of the plurality of response signals, modify the response signal with the at least one signal filter to generate a modified signal; for each of the plurality of response signals, generate a noise profile of at least a portion of the modified signal; and select, from among the plurality of response signal noise profiles, the noise profile having the largest variance.

Another example network device includes any or all of the foregoing components wherein the test circuitry is further configured to: generate a third noise associated with at least one additional noise source; and determine the signal-to-noise ratio of the through channel based on the first, second and third noise profiles.

Another example network device includes any or all of the foregoing components wherein the test circuitry is further configured to generate a metric related to at least one channel quality parameter, based on the first and second noise profiles; wherein the metric is a noise metric that is based on a target metric defined by the Ethernet communications protocol.

Another example network device includes any or all of the foregoing components wherein the target metric is a symbol error ratio (SER), and wherein the metric is used for a compliance measure, defined by the Ethernet communications protocol, for the channel quality of the through channel.

Another example of the present disclosure is a system that includes one or more storage mediums having stored thereon, individually or in combination, instructions that when executed by one or more processors result in the following operations including: designate a through channel and at least one crosstalk channel from among a plurality of channels; determine, in the time domain, an approximate available signal voltage of a first response signal, wherein the first response signal is in response to a test signal applied to the through channel; determine a first noise profile of the first response signal in response to the test signal applied on the through channel; determine a second noise profile of a second response signal, wherein the second response signal is in response to the test signal applied on a crosstalk channel and measured on the through channel; and determine a signal-to-noise ratio of the through channel based on, at least in part, the approximate available signal voltage and the first and second noise profiles.

Another example system includes any or all of the foregoing operations wherein the signal filter includes a filter associated with Tx and/or Rx circuitry.

Another example system includes any or all of the foregoing operations wherein the instructions result in the following additional operations, comprising: modify the first response signal with a plurality of adjustable filter setting and, for each adjustable filter setting: generate a plurality of modified signals, one for each adjustable filter setting; for each modified signal, sample the signal at a sampling rate that is based on the test signal; for each modified signal, determine an approximate available signal amplitude; for each modified signal, determine a noise region; for each modified signal, determine a signal-to-noise ratio based on, at least in part, the available signal amplitude and the noise region; and select one of the modified signals having the largest signal-to-noise ratio; and wherein the first noise profile is generated using the selected modified signal.

Another example system includes any or all of the foregoing operations wherein the instructions result in the following additional operations, comprising: determine the first noise profile is determined by: determine a first positive zero crossing of the first response signal; sample the first response signal at a sampling rate that based on the test signal; and designate a portion of the first response signal as an interference signal region, wherein the interference signal region is based on at least one parameter of the Rx circuitry and the noise profile is determined based on a region of the first response signal that is outside of the interference region.

Another example system includes any or all of the foregoing operations wherein the instructions result in the following additional operations, comprising: determine the second noise profile by determining, for each of a plurality of crosstalk channels, a plurality of corresponding response signals that are each measured on the through channel and generated in response to the test signal on each of the plurality of crosstalk channel; for each of the plurality of response signals, modify the response signal with the at least one signal filter to generate a modified signal; for each of the plurality of response signals, generate a noise profile of at least a portion of the modified signal; and select, from among the plurality of response signal noise profiles, the noise profile having the largest variance.

Another example system includes any or all of the foregoing operations wherein the instructions result in the following additional operations, comprising: generate a third noise associated with at least one additional noise source; and determine the signal-to-noise ratio of the through channel based on the first, second and third noise profiles.

Another example system includes any or all of the foregoing operations wherein the instructions result in the following additional operations, comprising: generate a metric related to at least one channel quality parameter, based on the first and second noise profiles; wherein the metric is a noise metric that is based on a target metric defined by the Ethernet communications protocol.

Another example system includes any or all of the foregoing operations wherein the target metric is a symbol error ratio (SER), and wherein the metric is used for a compliance measure, defined by the Ethernet communications protocol, for the channel quality of the through channel.

Another example of the present disclosure is test equipment that that includes test circuitry configured to test a plurality of channels between two functional units; the test circuitry is further configured to emulate PHY circuitry comprising transmit circuitry (Tx) and receive circuitry (Rx) associated with network devices configured to be coupled to the channels and emulate at least one signal filter associated with the channels, wherein the channels. PHY circuitry and at least one signal filter are defined, at least in part, by an Ethernet communications protocol; the test circuitry is further configured to: designate a through channel and at least one crosstalk channel from among the channels; determine, in the time domain, an approximate available signal voltage of a first response signal, wherein the first response signal is in response to a test signal applied to the through channel; determine a first noise profile of the first response signal in response to the test signal applied on the through channel; determine a second noise profile of a second response signal, wherein the second response signal is in response to the test signal applied on a crosstalk channel and measured on the through channel; and determine a signal-to-noise ratio of the through channel based on, at least in part, the approximate available signal voltage and the first and second noise profiles.

Another example network device includes any or all of the foregoing components wherein the signal filter includes a filter associated with the Tx and/or Rx circuitry.

Another example network device includes any or all of the foregoing components wherein the test circuitry is further configured to modify the first response signal with a plurality of adjustable filter setting and, for each adjustable filter setting: generate a plurality of modified signals, one for each adjustable filter setting; for each modified signal, sample the signal at a sampling rate that is based on the test signal; for each modified signal, determine an approximate available signal amplitude; for each modified signal, determine a noise region; for each modified signal, determine a signal-to-noise ratio based on, at least in part, the available signal amplitude and the noise region; and select one of the modified signals having the largest signal-to-noise ratio; and wherein the first noise profile is generated using the selected modified signal.

Another example network device includes any or all of the foregoing components wherein the test circuitry is further configured to determine the first noise profile is determined by: determine a first positive zero crossing of the first response signal; sample the first response signal at a sampling rate that based on the test signal; and designate a portion of the first response signal as an interference signal region, wherein the interference signal region is based on at least one parameter of the Rx circuitry and the noise profile is determined based on a region of the first response signal that is outside of the interference region.

Another example network device includes any or all of the foregoing components wherein the test circuitry is further configured to: determine the second noise profile by determining, for each of a plurality of crosstalk channels, a plurality of corresponding response signals that are each measured on the through channel and generated in response to the test signal on each of the plurality of crosstalk channel; for each of the plurality of response signals, modify the response signal with the at least one signal filter to generate a modified signal; for each of the plurality of response signals, generate a noise profile of at least a portion of the modified signal; and select, from among the plurality of response signal noise profiles, the noise profile having the largest variance.

Another example network device includes any or all of the foregoing components wherein the test circuitry is further configured to: generate a third noise associated with at least one additional noise source; and determine the signal-to-noise ratio of the through channel based on the first, second and third noise profiles.

Another example network device includes any or all of the foregoing components wherein the test circuitry is further configured to generate a metric related to at least one channel quality parameter, based on the first and second noise profiles; wherein the metric is a noise metric that is based on a target metric defined by the Ethernet communications protocol.

Another example network device includes any or all of the foregoing components wherein the target metric is a symbol error ratio (SER), and wherein the metric is used for a compliance measure, defined by the Ethernet communications protocol, for the channel quality of the through channel.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network device, comprising:
   physical layer (PHY) circuitry comprising transmit circuitry (Tx) and receive circuitry (Rx), wherein the Tx and Rx circuitry are configured to be coupled to a respective channel to communicate with an external device via the channels, wherein the network device configured to communicate with the external device using an Ethernet communications protocol; and
   test circuitry configured to:
   designate a through channel and at least one crosstalk channel from among the channels;
   determine an approximate peak amplitude, S, of a first response signal that is measured on the through channel and generated in response to a test signal on the through channel;
   modify the first response signal with at least one signal filter to generate a first modified signal;
   determine a noise region of the first modified signal; generate a first probability density function (PDF) of at least a portion of the noise region of the first modified signal;
   determine a second response signal that is measured on the through channel and generated in response to the test signal on a crosstalk channel;
   modify the second response signal with the at least one signal filter to generate a second modified signal;
   generate a second PDF of at least a portion of the second modified signal;
   combine the first and second PDFs to generate a total noise PDF of the through channel; and
   determine a signal-to-noise ratio of the through channel based on, at least in part, S and the total noise PDF.

2. The network device of claim 1, wherein the signal filter includes a filter associated with the Tx and/or Rx circuitry.

3. The network device of claim 1, wherein the test circuitry is further configured to modify the first measured signal with a plurality of adjustable filter setting and, for each adjustable filter setting:
   generate a plurality of modified signals, one for each adjustable filter setting;
   for each modified signal, sample the signal at a sampling rate that is based on the test signal;
   for each modified signal, determine an approximate peak amplitude;
   for each modified signal, determine a noise region;
   for each modified signal, determine a signal-to-noise ratio based on, at least in part, the peak amplitude and the noise region; and
   select one of the modified signals having the largest signal-to-noise ratio;
   and wherein the first PDF is generated using the selected modified signal.

4. The network device of claim 1, wherein the test circuitry is further configured to:
   determine a first positive zero crossing of the first modified signal;
   sample the first modified signal at a sampling rate that based on the test signal; and
   designate a portion of the first modified signal as an interference signal region, wherein the interference signal region is based on at least one parameter of the Rx circuitry and the noise region is outside of the interference region.

5. The network device of claim 1, wherein the test circuitry is further configured to: determine, for each of a plurality of crosstalk channels, a plurality of corresponding response signals that are each measured on the through channel and generated in response to the test signal on each of the plurality of crosstalk channel;
   for each of the plurality of response signals, modify the response signal with the at least one signal filter to generate a modified signal;
   for each of the plurality of response signals, generate a PDF of at least a portion of the modified signal; and
   select, from among the plurality of response signal PDFs, the PDF having the largest variance.

6. The network device of claim 1, wherein the test circuitry is further configured to:
   generate a third PDF associated with at least one additional noise source; and
   determine the signal-to-noise ratio of the through channel based on the first, second and third PDFs.

7. The network device of claim 1, wherein the test circuitry is further configured to generate a metric related to at least one channel quality parameter, based on the total noise PDF;

wherein the metric is a noise metric that is based on a target metric defined by the Ethernet communications protocol.

8. The network device of claim 7, wherein the target metric is a symbol error ratio (SER), and wherein the metric is used for a compliance measure, defined by the Ethernet communications protocol, for the channel quality of the through channel.

9. A method for determining a signal-to-noise ratio of a through channel, wherein the through channel provides a communications path between a first device and a second device and first and second devices are configured to communicate with each other using an Ethernet communications protocol, the method comprising:
   determining an approximate peak amplitude, S, of a first response signal that is measured on the through channel and generated in response to a test signal on the through channel;
   modifying the first response signal with at least one signal filter to generate a first modified signal;
   determining a noise region of the first modified signal;
   generating a first probability density function (PDF) of at least a portion of the noise region of the first modified signal;
   determining a second response signal that is measured on the through channel and generated in response to the test signal on a crosstalk channel;
   modifying the second response signal with the at least one signal filter to generate a second modified signal;
   generating a second PDF of at least a portion of the second modified signal;
   combining the first and second PDFs to generate a total noise PDF of the through channel; and
   determining a signal-to-noise ratio of the through channel based on, at least in part, S and the total noise PDF.

10. The method of claim 9, wherein the signal filter includes a filter associated with the transmit circuitry (Tx) and/or receive circuitry (Rx) coupled to the through channel.

11. The method of claim 9, further comprising:
   modifying the first measured signal with a plurality of adjustable filter setting and, for each adjustable filter setting:
   generating a plurality of modified signals, one for each adjustable filter setting;
   for each modified signal, sampling the signal at a sampling rate that is based on the test signal;
   for each modified signal, determining an approximate peak amplitude;
   for each modified signal, determining a noise region;
   for each modified signal, determining a signal-to-noise ratio based on, at least in part, the peak amplitude and the noise region; and
   selecting one of the modified signals having the largest signal-to-noise ratio;
   and wherein the first PDF is generated using the selected modified signal.

12. The method of claim 9, further comprising:
   determining a first positive zero crossing of the first modified signal;
   sampling the first modified signal at a sampling rate that based on the test signal; and
   designating a portion of the first modified signal as an interference signal region, wherein the interference signal region is based on at least one parameter of receive circuitry coupled to the through channel and the noise region is outside of the interference region.

13. The method of claim 9, further comprising:
   determining, for each of a plurality of crosstalk channels, a plurality of corresponding response signals that are each measured on the through channel and generated in response to the test signal on each of the plurality of crosstalk channel;
   for each of the plurality of response signals, modifying the response signal with the at least one signal filter to generate a modified signal;
   for each of the plurality of response signals, generating a PDF of at least a portion of the modified signal; and
   selecting, from among the plurality of response signal PDFs, the PDF having the largest variance.

14. The method of claim 9, further comprising:
   generating a third PDF associated with at least one additional noise source; and
   determining the signal-to-noise ratio of the through channel based on the first, second and third PDFs.

15. The method of claim 9, further comprising:
   generating a metric related to at least one channel quality parameter, based on the total noise PDF; wherein the metric is a noise metric that is based on a target metric defined by the Ethernet communications protocol.

16. The network device of claim 15, wherein the target metric is a symbol error ratio (SER), and wherein the metric is used for a compliance measure, defined by the Ethernet communications protocol, for the channel quality of the through channel.

17. A network device, comprising:
   physical layer (PHY) circuitry comprising transmit circuitry (Tx) and receive circuitry (Rx), wherein the Tx and Rx circuitry are configured to be coupled to a respective channel to communicate with an external device via the channels, wherein the network device configured to communicate with the external device using an Ethernet communications protocol; and
   test circuitry configured to:
   designate a through channel and at least one crosstalk channel from among the channels;
   determine, in a time domain, an approximate peak voltage of a first response signal, wherein the first response signal is in response to a test signal applied to the through channel;
   determine, in the time domain, a first noise profile of the first response signal in response to the test signal applied on the through channel;
   determine, in the time domain, a second noise profile of a second response signal, wherein the second response signal is in response to the test signal applied on a crosstalk channel and measured on the through channel; and
   determine, in the time domain, a signal-to-noise ratio of the through channel based on, at least in part, the approximate peak voltage and the first and second noise profiles.

18. The network device of claim 17, wherein the signal filter includes a filter associated with the Tx and/or Rx circuitry.

19. The network device of claim 17, wherein the test circuitry is further configured to modify the first response signal with a plurality of adjustable filter setting and, for each adjustable filter setting:
   generate a plurality of modified signals, one for each adjustable filter setting;
   for each modified signal, sample the signal at a sampling rate that is based on the test signal;
   for each modified signal, determine an approximate peak amplitude;
   for each modified signal, determine a noise region;

for each modified signal, determine a signal-to-noise ratio based on, at least in part, the peak amplitude and the noise region; and select one of the modified signals having the largest signal-to-noise ratio;

and wherein the first noise profile is generated using the selected modified signal.

20. The network device of claim 17, wherein the test circuitry is further configured to determine the first noise profile is determined by:

determine a first positive zero crossing of the first response signal;

sample the first response signal at a sampling rate that based on the test signal; and designate a portion of the first response signal as an interference signal region, wherein the interference signal region is based on at least one parameter of the Rx circuitry and the noise profile is determined based on a region of the first response signal that is outside of the interference region.

21. The network device of claim 17, wherein the test circuitry is further configured to: determine the second noise profile by determining, for each of a plurality of crosstalk channels, a plurality of corresponding response signals that are each measured on the through channel and generated in response to the test signal on each of the plurality of crosstalk channel;

for each of the plurality of response signals, modify the response signal with the at least one signal filter to generate a modified signal;

for each of the plurality of response signals, generate a noise profile of at least a portion of the modified signal; and select, from among the plurality of response signal noise profiles, the noise profile having the largest variance.

22. The network device of claim 17, wherein the test circuitry is further configured to:

generate a third noise associated with at least one additional noise source; and determine the signal-to-noise ratio of the through channel based on the first, second and third noise profiles.

23. The network device of claim 17, wherein the test circuitry is further configured to generate a metric related to at least one channel quality parameter, based on the first and second noise profiles; wherein the metric is a noise metric that is based on a target metric defined by the Ethernet communications protocol.

24. The network device of claim 23, wherein the target metric is a symbol error ratio (SER), and wherein the metric is used for a compliance measure, defined by the Ethernet communications protocol, for the channel quality of the through channel.

* * * * *